US009206831B2

(12) United States Patent
Pomerantz et al.

(10) Patent No.: US 9,206,831 B2
(45) Date of Patent: Dec. 8, 2015

(54) DUAL PITCH THREAD

(71) Applicants: Itzhak Pomerantz, Kefar Sava (IL); Uriel Pomerantz, Kefar Sava (IL)

(72) Inventors: Itzhak Pomerantz, Kefar Sava (IL); Uriel Pomerantz, Kefar Sava (IL)

(*) Notice: Subject to any disclaimer, the term of this patent is extended or adjusted under 35 U.S.C. 154(b) by 0 days.

(21) Appl. No.: 14/300,268

(22) Filed: Jun. 10, 2014

(65) Prior Publication Data

US 2015/0003934 A1  Jan. 1, 2015

Related U.S. Application Data

(60) Provisional application No. 61/839,661, filed on Jun. 26, 2013.

(51) Int. Cl.
*F16B 37/16* (2006.01)
*F16B 33/02* (2006.01)
*F16B 37/12* (2006.01)

(52) U.S. Cl.
CPC .............. *F16B 33/02* (2013.01); *F16B 37/122* (2013.01)

(58) Field of Classification Search
CPC ........................ F16B 33/02; F16B 25/0073
USPC .................... 411/436, 411–413, 415
See application file for complete search history.

(56) References Cited

U.S. PATENT DOCUMENTS

| | | | | | |
|---|---|---|---|---|---|
| 2,340,300 | A * | 2/1944 | Booth et al. | ................ | 411/436 |
| 2,588,372 | A * | 3/1952 | Erb | ................ | F16B 37/00 411/432 |
| 3,205,756 | A * | 9/1965 | Ollis, Jr. | ................ | F16B 33/02 411/411 |
| 3,266,363 | A * | 8/1966 | Bronson | ................ | F16B 33/02 411/436 |
| 3,311,147 | A * | 3/1967 | Walker | ................ | F16B 33/02 411/276 |
| 3,426,818 | A * | 2/1969 | Derby | ................ | 411/175 |
| 4,798,507 | A * | 1/1989 | Olah | ................ | 411/175 |
| 5,569,009 | A * | 10/1996 | Suzuki | ................ | 411/413 |
| 5,863,167 | A * | 1/1999 | Kaneko | ................ | F16B 5/0275 411/386 |
| 5,957,646 | A * | 9/1999 | Giannuzzi | ................ | F16B 25/00 411/311 |
| 6,015,252 | A * | 1/2000 | Peck | ................ | F16B 25/0021 411/387.1 |
| 6,401,758 | B1 * | 6/2002 | Ziv-Av | ................ | F16B 33/02 138/122 |
| 6,439,817 | B1 * | 8/2002 | Reed | ................ | 411/110 |
| 6,439,818 | B1 * | 8/2002 | Nagayama | ................ | 411/436 |
| 6,540,462 | B1 * | 4/2003 | Bretschneider et al. | ........ | 411/82 |
| 6,918,727 | B2 * | 7/2005 | Huang | ................ | F16B 5/0275 411/107 |
| 6,976,818 | B2 * | 12/2005 | Levey | ................ | F16B 39/30 411/310 |
| 7,832,970 | B2 * | 11/2010 | Wang et al. | ................ | 411/171 |
| 2003/0206787 | A1 * | 11/2003 | Huang | ................ | F16B 5/0275 411/412 |
| 2008/0080953 | A1 * | 4/2008 | Wu | ................ | F16B 25/0015 411/412 |
| 2010/0047035 | A1 * | 2/2010 | Rosenkranz | ........ | F16B 25/0026 411/387.4 |
| 2010/0108843 | A1 * | 5/2010 | Shaffer | ................ | 248/274.1 |
| 2012/0328391 | A1 * | 12/2012 | Levey et al. | ................ | 411/337 |
| 2013/0017032 | A1 * | 1/2013 | Levey et al. | ................ | 411/103 |
| 2014/0144003 | A1 * | 5/2014 | Davies | ................ | 411/222 |
| 2014/0208770 | A1 * | 7/2014 | Fitt et al. | ................ | 411/103 |

\* cited by examiner

*Primary Examiner* — Gay Spahn
*Assistant Examiner* — Roberta DeLisle
(74) *Attorney, Agent, or Firm* — The Law Office of Joseph L. Felber

(57) ABSTRACT

Disclosed herein is an object that has two threads of different pitches. The two threads overlap and may have a common starting point. The object may be any type of threaded insert, including those commonly referred to as a type of nut or rivet such as a clinch-nut, a weld-nut and a rivet-nut. Also disclosed is a system having a part and the disclosed insert installed onto it. Embodiments of the invention reduce the likelihood of damage when a screw is miss-matched with a similarly sized but different threaded hole.

10 Claims, 2 Drawing Sheets

DUAL PITCH THREAD

RELATED APPLICATION

This application claims priority under 35 U.S.C. §119(e) to U.S. Provisional Application No. 61/839,661, filed Jun. 26, 2013, which is hereby incorporated by reference in its entirety.

BACKGROUND

The following terms are defined for use in the present disclosure:
- Screw—meant here as the type known as a machine screw, a type of fastener featuring a male thread of some named standard which is used for mechanical assembly by matching with a suitable threaded hole
- Threaded hole—a fastening feature featuring a female thread formed in a hole or bore of some named standard to accommodate a machine screw
- A part—any object, fixture or assembly that is designed to be constructed with screws
- Threaded insert—an object featuring a threaded hole, which is designed to be installed in a part in order to accommodate a certain type of screw
- Through hardening—a process that increases the strength and or hardness of a metal part to its bulk as well as its surface
- Case hardening—a process that increases the strength and or hardness of a metal part to some skin depth below its surface Screws are commonly used to produce mechanical assemblies. There are several standards defining their properties such as dimensions, tolerance, pitch, thread form, materials etc. Essentially, screws are only intended to be mated with matching threaded holes; i.e., a metric screw designated M6X1.0 and produced according to the ISO 68-1 standard or a similar metric standard should only be mated with a threaded hole designated M6X1.0 according to the same, or a similar standard. Often a threaded hole is produced in a part by installing a threaded insert in it in some manner. The threaded insert may have properties such as high strength or thread locking that are hard to produce in the part itself and it may also be faster or cheaper to install a pre-threaded insert than to produce a thread in the part itself.

It is not uncommon for users to err and to install a screw forcefully into a miss- matched threaded hole. This mistake happens commonly when two similar sized screws are available to users. For example, the metric M6X1.0 screw has a nominal diameter of six millimeters and a pitch of 1.0 mm and the imperial type 1/4-20 UNC screw has a nominal diameter of 6.35 mm and a pitch of 1.27 mm. When an M6X1.0 screw is turned into a miss-matched 1/4-20 UNC threaded hole, it can take nearly an entire turn for the miss-matched threads to mesh into resistance. Many users will not realize that the screw is miss-matched at that point and try to force the screw in further. A miss-matched screw assembly can damage both the screw thread and the threaded hole, depending on the respective material strength. It may have implications ranging from a compromised strength of the assembly, through a damaged mounting thread on a valuable instrument such as a camera or an electro-optic measuring device, to a jammed screw that cannot be removed from the threaded hole. Another example of a common pair of metric and imperial screw sizes that are readily miss-matched is the metric M4X0.7 and the imperial #8-32 UNC screws.

Threaded holes produced in manufactured parts can be divided into two categories: those meant for use in the assembly of the product by designated personnel or an automated process; and those meant to remain free in the final product and used by the end user for mounting of the product or any other function. The first kind of threaded holes is less likely to suffer from miss-matching of screws as it is used as part of the assembly process, typically in accordance to instructions and subjected to quality control measures. The second kind of threaded holes is subjected to the risk of miss-matched screws, with varying severity. For some cases it would be advantageous to have a threaded hole which is able to accommodate both types of a commonly miss-matched screw pair safely in order to prevent the damage associated with a miss-matched screw installment.

SUMMARY

Embodiments of the present invention include a threaded insert that can accommodate two dissimilar screw types and produce a functional assembly with either of them without damaging either screws or the threaded insert itself. Although it is possible to form two female threads for two types of screws in a single hole directly in the bulk of a part, thus enabling both screws to thread into the hole without jamming, the two thread forms will be partial, as they cut into each other. The resulting threaded hole will feature reduced functional strength and durability compared to forming just one of the said threads. In a preferred embodiment the dual pitch threaded insert is produced of appropriate materials and treated so to strengthen and or harden it so to negate the reduction in strength associated with forming two threads in the same hole. In a preferred embodiment common steel hardening alloys and techniques such as through hardening by quenching and tempering, case hardening by carburizing, quenching and tempering and precipitation hardening by artificial aging are used to produce dual pitch threaded inserts featuring enhanced strength of the two female threads in an economical fashion. It is worth noting that some of the above hardening techniques are commonly used in the art of threaded inserts, for example, in order to harden the thread cutting external, male, thread to enable it to cut its own installment thread into metal parts.

In a preferred embodiment of the present invention, the two threads extend throughout the whole length of the dual-threaded object.

The invention may be embodied as an insert having a first female thread of a first pitch and a second female thread of a second pitch that is different from the first pitch and overlapping the first female thread. The first female thread and the second female thread have a common starting point at least in one end of the insert.

Embodiments of the present invention are described in detail below with reference to the accompanying drawings, which are briefly described as follows:

BRIEF DESCRIPTION The invention is described below in the appended claims, which are read in view of the accompanying description, including the following drawings, wherein:

The figures are not necessarily drawn to scale.

DETAILED DESCRIPTION

The invention summarized above and defined by the claims below will be better understood by referring to the present detailed description. This description is not intended to limit the scope of claims but instead to provide examples of the invention.

Figure 1A:
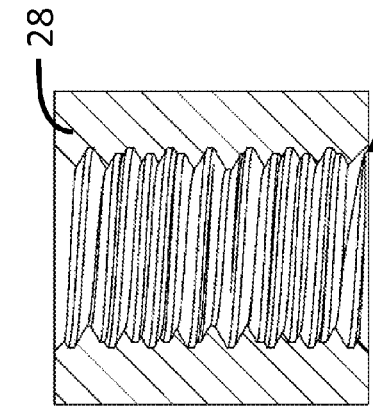
FIGS. 1A-1F illustrate background for an embodiment of the invention.

FIG. 1A shows a cross-section through an object featuring a conventional threaded hole 20 and a matching screw 22 threaded in it.

Figure 1C:
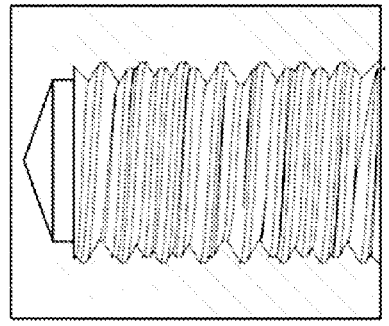
Figure 1B:
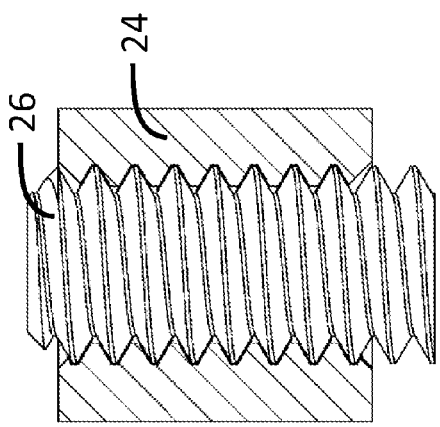

FIG. 1B shows a cross-section through an object featuring a similarly sized but different type of threaded hole 24 and a matching screw threaded in it.

FIG. 1C shows a cross-section through an object 28 designed according to an embodiment of the present invention. Object 28 can be regarded as having a threaded hole into which both thread types, 20 and 24, are formed thereon.

In one embodiment of the invention, both threads start at the same point 29 with sufficient accuracy, so that there is only one starting point for both threads into the threaded hole, at least from one, designated, entry side of the hole. This feature ensures that both screw types begin threading into the correct thread as there is only one common starting point from which each screw continues threading into its correct thread according to its pitch.

Figure 1E:
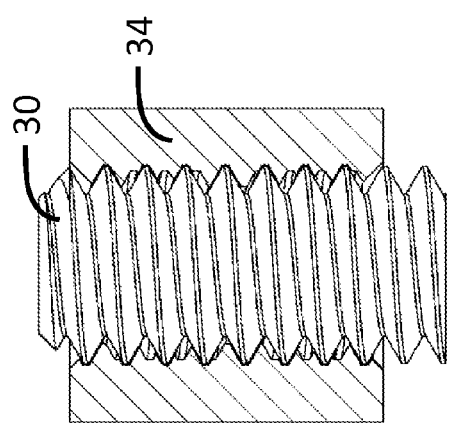
Figure 1D:
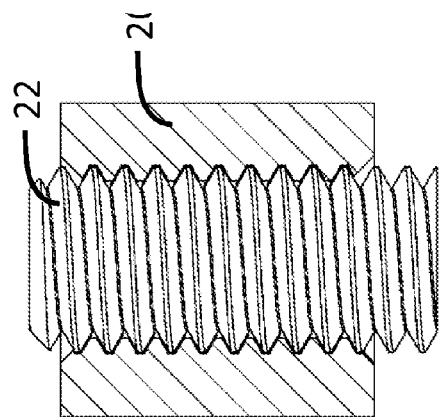

FIG. 1D shows an object 36 that is identical to object 28 of the present invention with screw 32 that is identical to screw 22 in FIG. 1A. It is clearly seen that the screw does not collide with the nut, and cannot be pushed in or pulled out without rotation as some of the thread surface are blocking the screw from moving forward and some are blocking it from moving backward.

FIG. 1E shows an object 34 that is identical to object 28 of the present invention with screw 30 that is identical to screw 26 in FIG. 1B. It is clearly seen that the screw does not collide with the nut and cannot be pushed in or pulled out without rotation as some of the thread surface are blocking the screw from moving forward and some are blocking it from moving backward.

Figure 1F:
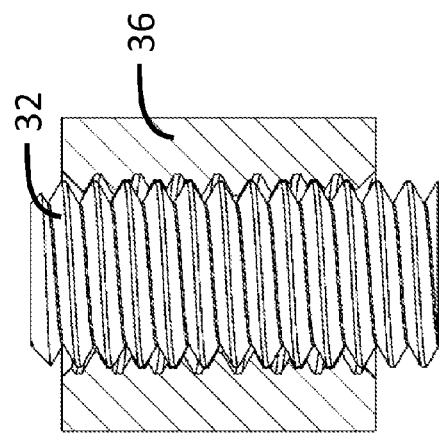

As screws 30 and 32 are dissimilar, object 28 provides a dual pitch threaded insert. FIG. 1F shows an alternative implementation to that of FIG. 1E with a blind hole, rather than through hole, in the insert.

Figure 2A:
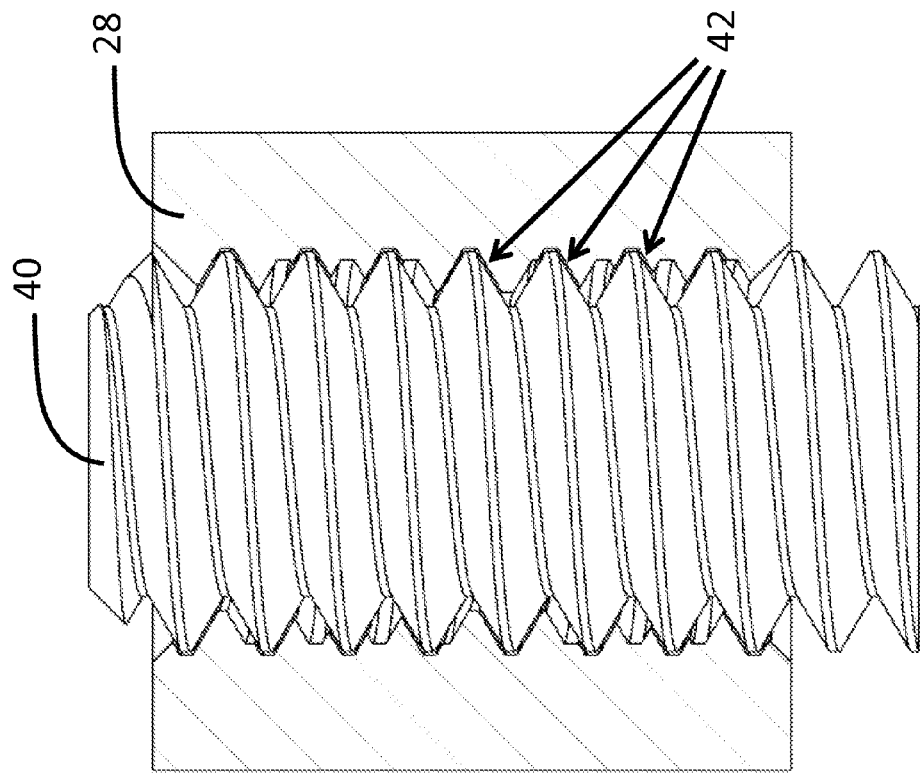
FIGS. 2A-2B illustrate the support surfaces of two different type screws.
Figure 2B:
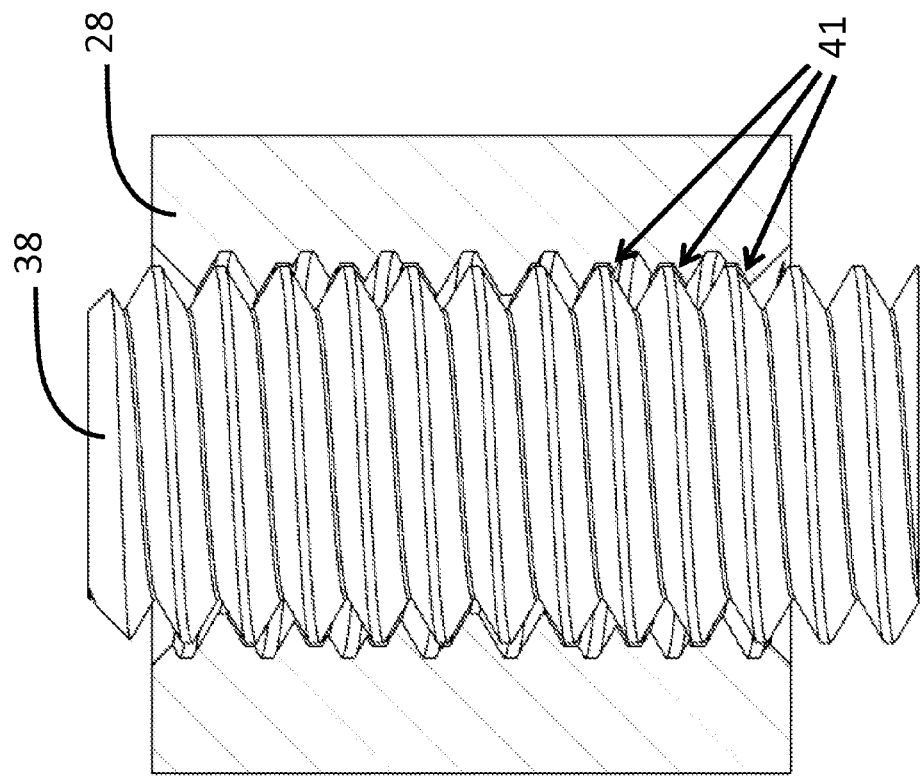

Attention is now called to FIG. 2A and 2B showing an enlargement of FIGS. 1D and 1E, respectively, showing the areas where the two different screws are supported by the object. In FIG. 2A there is seen a screw with a smaller diameter and finer pitch 38, supported at areas 41 of object 28, and in FIG. 2B there is seen a screw with a larger diameter and coarser pitch 40 supported at areas 42 of object 28. Object 28 is the same in both figures.

It should be noted that while the explanation above was about a dual pitch thread in a generic fastening object, the explanation equally holds for a preferred embodiment in which there is a dual pitch thread in any type of threaded insert that is installed in a part. Threaded inserts may be, to name only few, threaded into a pre-threaded hole, press-fitted into a pre-drilled hole, cast into a metal part, molded into a plastic part, glued in or melted into various materials, clinched, or riveted onto a sheet-metal part or object or installed in a part in any other manner. The threaded inserts may instead cut or press their own thread into a pre-drilled hole. In some embodiments, the part and the insert are made of different materials.

Alternate embodiments are within the scope of the invention. For example, the disclosed insert may be embodied as threaded insert for installation in a bulk object. Also, the insert may be produced from a metal or metallic alloy and hardened. Further, hardening of the insert may be result from through hardening or case hardening. Additionally, the insert may have a blind hole or a through hole.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

What is claimed is:

1. An insert comprising:
   a first female thread of a first pitch; and
   a second female thread of a second pitch that is different from the first pitch and overlapping said first female thread;
   wherein the two threads also differ in diameters and/or thread form;
   wherein said first female thread and said second female thread have a common starting point at least in one end of said insert to prevent the damage associated with a miss matched screw installment.

2. The insert of claim 1, wherein the insert is a threaded insert for installation in a bulk object.

3. The insert of claim 2, wherein the insert has a blind hole.

4. The insert of claim 2, wherein the insert has a through hole.

5. The insert of claim 1, wherein the insert is a threaded insert for installation in a sheet-metal object.

6. The insert of claim 1, wherein the insert is produced from a metal or metallic alloy and hardened.

7. The insert of claim 6, wherein hardening thereof results from through hardening.

8. The insert of claim 6, wherein hardening thereof results from case hardening.

9. A system comprising the insert of claim 1 inserted into a part, wherein the part is made of a different material than the insert.

10. The insert of claim 1 further comprising:
    an extraction-resistant engageable exterior.

* * * * *